Nov. 23, 1954  J. L. BARKER  2,695,404
SPEED DETECTOR
Filed Feb. 28, 1950  3 Sheets-Sheet 1

FIG. 1

INVENTOR.
JOHN L. BARKER
BY
*Edward H. Cairns*
ATTORNEY.

Nov. 23, 1954     J. L. BARKER     2,695,404
SPEED DETECTOR
Filed Feb. 28, 1950     3 Sheets-Sheet 2

INVENTOR.
JOHN L. BARKER
BY
*Edward H. Cairns*
ATTORNEY.

Nov. 23, 1954     J. L. BARKER     2,695,404
SPEED DETECTOR Filed Feb. 28, 1950     3 Sheets-Sheet 3

INVENTOR.
JOHN L. BARKER
BY Edward H. Cairns
ATTORNEY.

United States Patent Office 2,695,404
Patented Nov. 23, 1954

2,695,404
SPEED DETECTOR

John L. Barker, Norwalk, Conn., assignor to Eastern Industries, Incorporated, East Norwalk, Conn., a corporation of Delaware Application February 28, 1950, Serial No. 146,895

11 Claims. (Cl. 343—8)

This invention relates to a system for detecting or determining the speed of a moving object by electromagnetic waves, and more particularly relates to such detection or determination by the comparison of transmitted waves with received waves reflected from the object to obtain an output characteristic of the speed of the object directionally toward or away from the transmitting-receiving station. From another aspect the invention may employ comparison of waves transmitted from the moving object toward a reference or reflecting surface, with waves received as reflected from such surface to obtain an output characteristic of the speed of the object directionally toward or away from such reference surface.

Various methods of determining distance or speed by means of acoustic or electromagnetic oscillations reflected from an object are already well-known. Among the known systems are those in which radio micro-waves of a constant frequency are transmitted toward an object and part of the waves reflected from the object are beaten against a part of the transmitted waves to obtain a beat frequency characteristic of the radial speed of the object with respect to the transmitting-receiving station, in accordance with the so-called Doppler effect which causes the beat frequency to vary in proportion to the speed.

For most objects such as road vehicles, airplanes and the like traveling at ordinary speeds the speed of the object is extremely small relative to the speed of the radio waves themselves and the shift in frequency produced by the Doppler effect is consequently an extremely small part of the transmitted or carrier frequency.

Although it is well-known that the Doppler effect causes an increase in the received frequency for objects approaching the transmitting-receiving station and a decrease in received frequency for objects departing from or moving away from the transmitting-receiving station, this frequency change is such a small proportion of the total frequency that the detection of this small change directionally with respect to approach and departure of the object has presented a major problem.

Thus although it has been known that the speed can be determined quite accurately by beating the reflected and transmitted waves directly so as to obtain a difference beat frequency directly proportional to the speed, this difference frequency value thus obtained is nondirectional, that is the difference frequency is the same whether the object is approaching or departing. However in determining the directional value of such speed it is necessary to determine whether the Doppler change in frequency is added to or subtracted from the transmitted frequency or in other words to compare the Doppler shifted frequency algebraically with the transmitted frequency itself. For speeds of the order of 2 to 20 miles per hour, this involves the measurement of a frequency shift of the order of 1 to 10 parts in 167,000,000 and determining whether such frequency shift is positive or negative.

In accordance with the present invention this problem is solved by multiple stage heterodyne treatment of the received frequency as reflected from the object, by beating the received frequency against a first stage of heterodyning frequency obtained from the transmitted frequency to obtain a first intermediate frequency, and then in turn beating this intermediate frequency against a second lower stage heterodyning frequency obtained from the previous stage heterodyning frequency, and so on through successive stages until a frequency is obtained as a carrier comparable to the Doppler difference frequency so that by subtraction of a base frequency from a component characteristic of the received frequency as increased or decreased by the Doppler effect a resultant frequency will be obtained which will be relatively large for approach and relatively small for departure for example, with mid-frequency value for zero speed, and will provide a substantially straight line frequency characteristic of speed from a desired maximum negative speed value for departure through zero to a desired maximum positive speed value for approach over the speed range for which it is desired to have the apparatus operate.

It has been found that this may be accomplished successfully according to the invention by having each heterodyne oscillator of the successive stages heterodyned against the oscillator of the preceding stage, starting with the oscillator for the original transmitted frequency, to obtain a cancelling out of frequency errors particularly in the high frequency stages.

The invention has particular advantages for very low speed such as that of a very slow moving vehicle in roadway traffic for example, and for the determination of the rate of climb or rate of fall of aircraft with respect to the surface of the ground or an aircraft carrier or the surface of the water in case of aircraft take-off or landing operations.

Thus from one aspect of the invention it offers a means and method of directional detection of a vehicle moving at any appreciable speed along a roadway for traffic control or traffic checking purposes. From another aspect the invention provides a means and method of measuring the speed of vehicular traffic for approaching vehicles only for example in a two-way roadway to serve as a portable roadside traffic speed meter without the need of cumbersome equipment for providing an extremely concentrated beam of radio waves that would otherwise be necessary to distinguish traffic on one side of the road from that on the other.

From another aspect a speed detecting apparatus according to the invention may be mounted on the ground to determine the speed of airplanes or land vehicles, or the apparatus may be placed on the vehicle to determine the speed of the vehicle directionally with respect to fixed objects on the ground or with respect to the ground itself. The apparatus may be placed on an aircraft with the radio beam directed substantially vertically to the ground as a reflector to determine the rate of climb or descent for example.

The significance of this method of detection and determination of speed and the magnitude of the problem solved by the present invention may also be seen in one example of the operation of the apparatus according to the invention at one set of frequency values and speed which are merely cited as an example rather than in any limiting sense. If a transmitting frequency of 2455 megacycles is employed the corresponding received signal for an approaching vehicle traveling within a speed range of 2 to 20 miles per hour for example would be 2,455,000,015 cycles to 2,455,000,146 cycles for example. Obviously for such a transmitted frequency the received frequency for a vehicle approaching at 60 miles an hour would be 2,455,000,438 cycles and for a vehicle departing at 60 miles per hour would be 2,454,999,562 cycles. Thus as noted above for the low speeds particularly it is necessary to determine accurately and discriminate as to its plus or minus value a change of frequency of the order of 1 to 10 parts in 167,000,000.

It will be understood from the teachings of the invention that if it were possible as a practical matter to obtain a first heterodyning oscillator of a sufficiently accurate and stable frequency and to obtain filter circuits capable of separating frequencies in the ultra high frequency range differing by a frequency in the low audio range, then the determination of the speed directionally from the Doppler effect could be accomplished by beating the Doppler bearing received frequency against a frequency differing from the transmitted frequency by a constant frequency of the order of the maximum Doppler shift corresponding to the maximum speed to be determined. Continuing as an illustrative example, if a transmitted frequency of 2455 megacycles was employed and a maximum Doppler shift of 550 cycles was expected for a maximum speed of 75 miles per hour, and if sufficiently accurate oscillators and filter elements and the like were available within practical limits, the received frequency could be heterodyned directly against a comparison frequency of 2455 megacycles plus 1000 cycles for example, and a difference frequency thereby obtained of 1000 cycles plus or minus the Doppler shift frequency respectively for approach or departure. If such a direct comparison were practical in such example, the resultant frequency would vary between 450 cycles for a maximum departure speed of 75 miles per hour corresponding to a negative Doppler shift of 550 cycles, through a frequency value of 1000 cycles for zero speed, and up to a frequency of 1550 cycles for a maximum approach speed of 75 miles per hour for a positive Doppler shift of 550 cycles, and could be readily applied to a frequency meter for example to measure speed directionally. Any such one step direct comparison has been found impractical with apparatus at present available to my knowledge. Thus in the preferred form of the invention the final comparison frequency of the order of the Doppler shift frequency is obtained by heterodyning to successively lower stages in several steps.

It will be further appreciated in connection with the teachings of the invention that if oscillators of sufficient frequency stability and freedom from noise could be obtained for the several heterodyne stages it would be possible to select heterodyning oscillators having frequencies successively differing from the transmitted frequency and from the preceding stage heterodyning frequency respectively by as small an amount as possible while still obtaining proper filtering to select the successive differential frequencies as the successive intermediate frequencies. Thus, for example and without intending to be limited thereto, if sufficiently stable oscillators could be obtained for the transmitting oscillator and the successive heterodyning oscillators, a 2455 megacycle transmitting oscillator could be employed and heterodyne oscillators of 2445 megacycles, 9.535 megacycles, 445 kilocycles and 19 kilocycles could be employed for the successive heterodyning stages to obtain intermediate frequencies of 10 megacycles, 465 kilocycles, 20 kilocycles and 1000 cycles at such successive stages, this final intermediate frequency serving as a final Doppler indicating frequency-speed scale signal of 1000 cycles plus the Doppler shift or minus the Doppler shift, in accordance with the direction of the speed as to approach or departure.

However it has been found to present serious practical problems in attempting to provide such several heterodyne stages by direct heterodyne oscillators having only a relatively small frequency displacement from the transmitter oscillator or a preceding stage oscillator respectively, since the oscillators serving as transmitter oscillators or for the higher heterodyne stages ordinarily have sufficient frequency error to interfere with an accurate determination of the relatively small Doppler shift frequency. It will be appreciated that a very small error in the frequency of the transmitter oscillator or the first stage heterodyne oscillator could easily be many times the order of magnitude of the Doppler shift frequency itself.

Therefore in accordance with the invention it has been found that automatic cancellation of such errors at the higher frequencies may be obtained by selecting for each stage a heterodyne oscillator having a frequency corresponding to the average intermediate frequency desired for that stage and first mixing the frequency of this heterodyne oscillator with that of the oscillator of the preceding stage to obtain the desired resultant heterodyning frequency which in turn can be mixed with the signal frequency of the preceding stage to obtain the new intermediate or lower signal frequency desired. As pointed out more fully below the frequency of the heterodyne oscillator of the first stage is mixed with the frequency of the transmitter oscillator and a beat frequency obtained which in turn serves as the heterodyning frequency to be mixed with the received signal at this first stage to provide an output beat frequency comprising the first intermediate frequency. The frequency of the second heterodyne oscillator at the second stage is mixed with the frequency of the first heterodyne oscillator of the preceding stage to obtain a beat frequency serving as the second stage heterodyning frequency to mix with the first intermediate frequency to obtain a new lower second intermediate frequency. This process is repeated for as many stages as desired to obtain an intermediate frequency or resultant frequency comparable to the Doppler shift frequency which can then be used for measuring or detecting purposes as desired.

As further pointed out below the beat frequency obtained from the mixture of the heterodyne oscillator for one stage with the oscillator for the preceding stage can be either the difference beat frequency of the sum frequency. However in the preferred form of the invention the difference beat frequency is employed consistently to retain the proper plus or minus sign of the Doppler shift as representing approach or departure. At each stage in accordance with the invention the difference between the heterodyning frequency and the intermediate frequency or signal frequency of the preceding stage is employed as the new intermediate frequency or signal frequency in order to obtain cancellation of the frequency errors of the higher frequency oscillators. It will be apparent that such cancellation of frequency errors, as applied to the transmitting oscillator, refers to constant or relatively slow drift frequency errors as further described below. By this system and method according to the invention the frequency error of the transmitter oscillator is eliminated and the error of the first heterodyne oscillator substituted in the signal frequency at the first heterodyne stage, and each successive stage eliminates the error of the oscillator of the preceding stage and substitutes the error of the oscillator of that stage so that at the final stage the only oscillator frequency error remaining is that of the low frequency oscillator of this final stage, and it will be appreciated that this oscillator error can be kept at a negligible value in relation to the speed determining signal frequency at this stage since the oscillator for this final stage has a frequency comparable to the maximum Doppler shift frequency.

It is a general object of the invention to provide a method and apparatus for determining directionally the speed of a moving object with respect to an observing station or reference point.

It is also an object of the invention to provide an improved method and apparatus for detection of a moving object approaching at any appreciable speed toward a detection station, as distinguished from all stationary objects or objects moving away from the detection station.

It is another object of the invention to differentially detect a moving object with respect to its approach or departure from a detection station.

It is another object of the invention to provide an improved method and apparatus for the remote determination of speed of moving objects.

It is another object of the invention to provide an improved speed meter for determining directionally the speed of vehicular traffic and other moving objects.

It is also an object of the invention to provide an improved speed meter for determining directionally the speed of aircraft with respect to the ground or the rate of climb or descent with respect to the ground or other landing surface.

Other objects will subsequently appear from the following description of apparatus and methods in accordance with the invention and from the accompanying claims.

The invention and a preferred embodiment thereof will become more apparent in the following detailed description in reference to the accompanying drawings in which.

Figure 1:
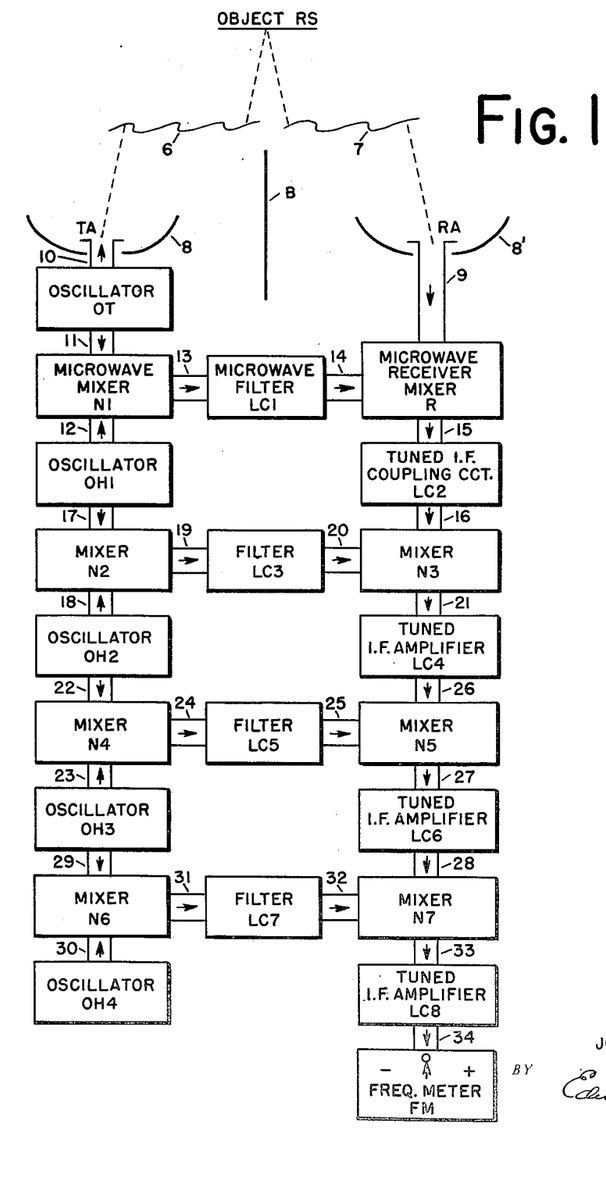
Fig. 1 is a block diagram illustrating schematically one form of a speed determining system embodying the invention.

Referring now to Fig. 1 illustrating one preferred form of the invention, an oscillator OT providing a constant frequency preferably although not necessarily in the micro-wave range is connected via line 10 with a transmitting antenna TA of the dipole or other suitable type for radiation of a constant frequency signal in a relatively narrow pattern toward the object with respect to which it is desired to detector determine the relative speed. The object is represented diagrammatically as a reflecting surface RS. A receiving antenna RA is indicated schematically for receiving the signal reflected from the object as modified by the Doppler effect to increase or decrease the apparent frequency in accordance with relative approach or departure of the object. The receiving antenna RA is connected by line 9 to a receiver-mixer R, both being preferably of the micro-wave type.

The paths of the transmitted and reflected waves to and from RS are indicated schematically by the dotted lines broken by wavy lines 6 and 7 respectively. It will be appreciated that these paths will actually be unbroken substantially straight lines, substantially parallel or having only a slight angle, with the distance to RS ordinarily much greater than the distance between TA and RA. As shown in Fig. 1 the angle between these paths is somewhat exaggerated and the dotted lines interrupted by the wavy lines 6 and 7 to reduce the size of the drawing and indicate that the object RS is much farther from the transmitter-receiver station than appears because of size limitation in the drawing.

The antennas TA and RA have a suitable radiation pattern and arrangement so that any energy radiated directly from antenna TA to antenna RA will be negligible, as indicated schematically by the barrier B in Fig. 1. The radiated energy and received energy may be concentrated by means of parabolic reflectors 8 and 8' or other well-known means.

A part of the transmitted frequency signal as generated by the oscillator OT is fed via line 11 to the mixer N1 which is preferably of the balanced micro-wave type for example, providing an output substantially free of any fundamental frequency component. A first heterodyne oscillator OH1 is also connected via line 12 to have its output supplied to the input of the mixer N1 to be mixed with the part of the transmitter signal previously described.

This first heterodyne oscillator OH1 has a frequency much lower than that of the transmitter oscillator OT. In general the frequency of the heterodyne oscillator for each stage is made as much lower than the frequency of the oscillator of the preceding stage as possible while still obtaining a clear separation of the heterodyning frequencies in the filter circuits. Thus in general the frequency for the heterodyne oscillator of each stage is chosen at as low a frequency level as possible while still remaining outside the band width of the frequency of the preceding stage, and with the final objective of employing at the last stage, a heterodyne oscillator frequency comparable to and preferably somewhat larger than the maximum expected Doppler frequency.

The output of the mixer N1 is fed via line 13 to the input of a filter LC1 in the form of a micro-wave cavity resonator for example, tuned to one side band only of the mixture of sum and difference frequencies of the transmitted frequency of OT and the first heterodyne frequency of OH1 applied to its input. Preferably the output of filter LC1 is the difference between these frequencies although either side band may be selected as pointed out below.

This selected side band output of filter LC1 is applied via line 14 to receiver-mixer R to be mixed with the incoming received frequency signal on line 9 as modified by the Doppler effect as reflected from the object. This receiver-mixer may be of the micro-wave crystal detector type for example, which will provide on line 15 an output of mixed frequencies containing a difference frequency component having a mean value equal to the frequency of oscillator OH1 but shifted by the Doppler frequency. This component is selected by the tuned coupling circuit LC2 as a first intermediate frequency output on line 16.

A second oscillator OH2 provides a still lower heterodyne frequency which is now mixed via line 18 with the output of oscillator OH1 via line 17 by mixer N2, the output of which is passed via line 19 through a tuned filter LC3 and the selected side band output thus obtained is applied via line 20 to mixer N3 to heterodyne with the first intermediate frequency on line 16 previously obtained from the received signal.

The new output from the mixer N3 appearing on line 21 contains a lower Doppler modified intermediate frequency component comprising the difference between the heterodyning frequency of line 20 and the first intermediate frequency on line 16. This second intermediate frequency component from line 21 is selected by the tuned coupling circuit or intermediate frequency amplifier LC4 to obtain on line 26 the second intermediate frequency as an output for the second heterodyning stage.

This heterodyning process is continued through as many successively lower stages as needed or desired. Thus for the third stage the oscillator OH3 provides a lower heterodyne frequency on line 23 to be mixed in the mixer N4 with a part of the output of oscillator OH2 on line 22. The output of the mixer N4 on line 24 includes the upper and lower side bands of this mixture and the filter LC5 selects for its output on line 25 one of these side bands to be applied in the mixer N5 with the second intermediate frequency from line 26. The new lower difference frequency from this mixture appears as one component on line 27 at the output of mixer N5 and is selected by the tuned intermediate frequency amplifier LC6 as the third intermediate frequency output on line 28.

A fourth heterodyning stage is provided by oscillator OH4, mixer N6, filter LC7, mixer N7 and tuned IF amplifier LC8. The oscillator OH4 provides a heterodyne frequency comparable to the maximum Doppler frequency shift expected and the output of this oscillator is applied via line 30 to a part of the output of the preceding stage oscillator OH3 via line 29 in mixer N6. The output of mixer N6 contains the upper and lower side band frequencies of this mixture on line 31 and one of these side bands is selected by the filter LC7 as an output on line 32 to be heterodyned in mixer N7 against the third intermediate frequency appearing on line 28. The output of the mixer N7 on line 33 contains a new lower intermediate frequency component as the fourth or final intermediate frequency having the average frequency value of the frequency of oscillator OH4 with the algebraic addition of the Doppler shift frequency which may be plus or minus and in accordance with the directional value or sense of the speed. This final intermediate frequency component on line 33 is selected as an output on line 34 by the tuned I. F. amplifier LC8.

Figures 3, 4:
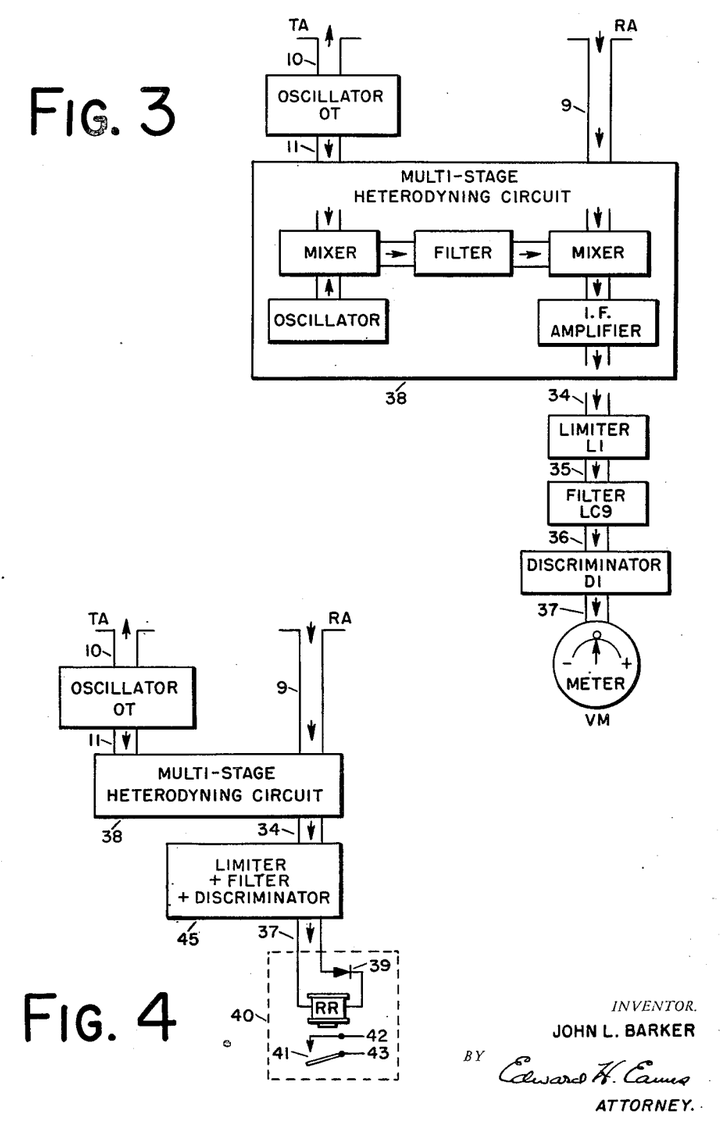
Fig. 3 is a block diagram showing a modification of the system of Fig. 1.
Fig. 4 is a schematic diagram showing a further modification of the invention.

This final intermediate frequency output on line 34 thus provides a frequency-speed scale of frequency values which may be used to measure the speed directionally or for detection or control purposes. In Fig. 1 this output at line 34 is shown connected to a frequency meter FM which may be calibrated in speed values for approach speed on one side and departure speeds on the other side of a zero position as indicated schematically by the minus, zero, and plus marks shown in this frequency meter FM. It will be appreciated that the output on line 34, providing a frequency value having the "sense" of the Doppler effect as indicating direction and numerical value of the speed, may be used for control of servo-mechanisms or other devices for control of an aircraft in relation to its rate of descent or climb in response to this vertical component Doppler sense output, as in landing or taking off operations for example, or may be used for other vehicular control, and some alternate forms of indicating, control or detection apparatus employing this output are shown in Figs. 3 and 4 as described more fully below.

In considering the embodiments of the invention as described in relation to the several figures of drawings it will be appreciated that more or less amplification may be provided at various points throughout the apparatus as desired or needed. Amplifier elements may be provided in connection with one or more of the filter circuits LC1, LC3, LC5 and LC7 for example if desired, and it may also be desired to add or omit amplification in some of the intermediate frequency coupling or amplifier circuits LC2, LC4, LC6, or LC8 for example, and it will be appreciated that these latter LC circuits include tuned coupling circuits for passing the intermediate frequency and filtering out other undesired frequencies but that preferably several of them include amplifier circuits for the intermediate frequency as shown.

It will be noted that in Fig. 1 and the other figures in general the transmitter oscillator OT and the heterodyne oscillator and mixers employed in obtaining successively lower heterodyning frequencies, starting from the transmitter frequency, appear in the column at the left hand side of the figure, and that this side may be referred to conveniently as the transmitter side of the multiple stage heterodyning circuit. Correspondingly it will be noted that the right hand column in the figure shows the receiver, mixer and tuned coupling and IF amplifier circuits for the Doppler modifier signal starting with the receiver, and this right hand column may be referred to conveniently as the receiver side of the multiple stage heterodyning circuit. The series of filters shown in the middle column appear in effect to link the heterodyne frequencies obtained on the transmitter side with the signal frequency and successive intermediate frequencies on the receiver side, but it will be appreciated that these middle filters LC1, LC3, LC5 and LC7 are associated primarily with the transmitter side of the circuit and that their output appearing at the right side of each of these filter circuits is derived from the transmitter side as described and contains none of the Doppler effect, so that the lines 14, 20, 25, and 32 represent the connecting links in effect for the respective heterodyne stages by which the non-Doppler heterodyning frequency obtained from the transmitter side is applied to the Doppler modified signal frequency at the successive stages on the receiver side of the figure.

It will also be appreciated that any of the filter circuits LC3, LC5 and LC7 for example may be divided into two filter stages with one on the input side and one on the output side of an amplifier element if an amplifier element is incorporated.

Figure 2:
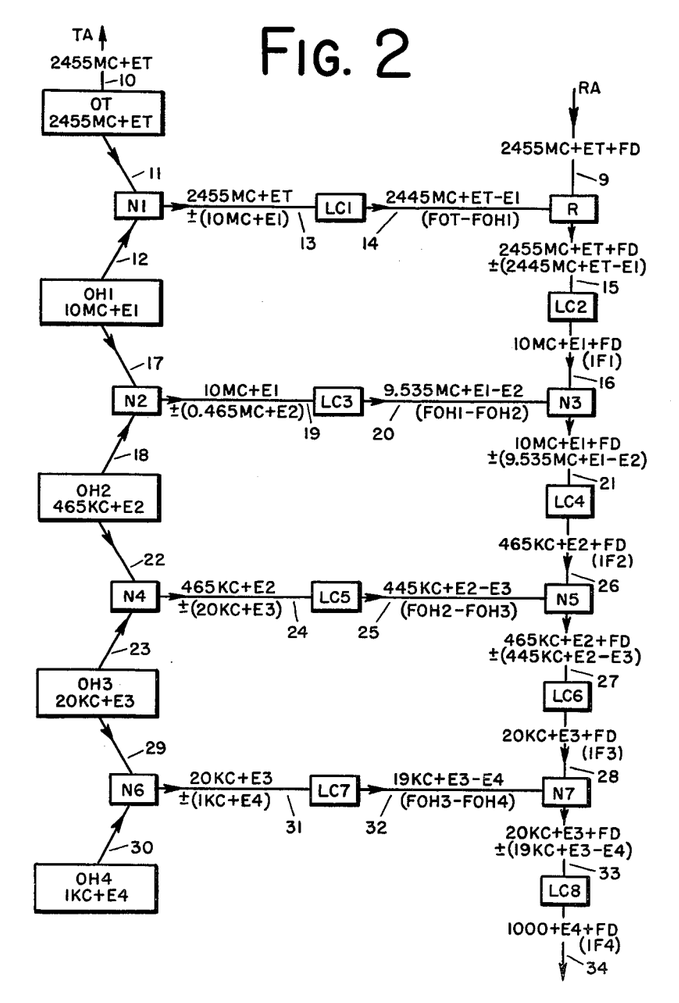
Fig. 2 is a schematic diagram showing one example of frequency values which may be employed in a system according to the invention.

Referring now to Fig. 2 the successive steps of heterodyning the received signal to successively lower frequencies by means of oscillators heterodyned first with the transmitted signal and then in turn with the preceding heterodyne oscillator on the transmitter side will be traced with numerical values and including the frequency errors of the various oscillators to show how these errors are cancelled according to the method and means of the invention. It is believed that the use of numerical values in the illustration of Fig. 2 will enable a better understanding of the invention and for the purpose of simplifying this illustration several assumptions are made and it will be understood that these assumptions and the numerical values employed are used in an illustrative rather than a limiting sense.

It will be assumed that the original transmitted frequency is 2455 megacycles and that the successive lower stage heterodyning oscillators have frequencies of 10 megacycles, 465 kilocycles, 20 kilocycles, and 1 kilocycle, respectively. It will also be assumed that the lower side band is selected by the filter circuits or tuned coupling or tuned amplifier circuits throughout from each mixture of frequencies at each heterodyning stage.

The Doppler frequency it will be appreciated may be positive or negative but is identified in this illustration as FD and is taken as added to any other frequency bearing the Doppler effect. It will be appreciated that this is an algebraic addition and that if the Doppler frequency FD is in fact negative as caused by departure speed for example this would actually reverse the sign from plus to minus. For simplicity in this illustration the Doppler frequency FD is shown added by a plus sign.

It will be appreciated that the oscillators OT, OH1, OH2, etc. for the original transmitting frequency and successive heterodyning stages may each of them have a slight frequency drift or noise frequency error which may be either positive or negative in relation to the fundamental frequency. It will also be appreciated that these errors may be positive in one stage and negative in another stage.

It will be understood that the frequency drift of oscillator OT during the time between transmission and reception of the wave energies must be negligible in relation to the Doppler frequency for successful operation. Any frequency drift producing the error ET, E1 etc. is very slow in relation to the time lag between transmission and reception.

For the purpose of illustration however it will be assumed that the frequency errors for these several oscillators are all positive and are represented by frequencies ET, E1, E2, E3 and E4 for the respective oscillators OT, OH1, OH2, OH3 and OH4.

Now tracing the effect of these errors in the system according to the invention and with the above assumptions as illustrated by Fig. 2 the frequency of oscillator OT will be 2455 megacycles plus the error ET and the frequency of oscillator OH1 will be 10 megacycles plus the error E1, and a mixture of these frequencies would include the following frequencies: the high fundamental frequency 2455 megacycles plus ET, the low frequency 10 megacycles plus E1, the high side band 2465 megacycles plus ET plus E1 and the low side band 2445 megacycles plus ET minus E1. However the two fundamental frequencies are reduced in the balanced mixer N1 to a substantially negligible energy level in relation to the two side bands, so that the output of mixer N1 comprises essentially the side bands 2465 MC+ET+E1 and 2445 MC+ET−E1 as indicated by the notation 2455 MC+ET±(10 MC+E1) on line 13. If the low side band is selected from the mixture by a microwave cavity LC1 tuned to this frequency, the heterodyning frequency of 2445 megacycles+ET−E1 is obtained on line 14 for the first stage of heterodyning in R against the received signal on line 9 containing the frequency of 2455 megacycles+ET+FD (the Doppler effect, which may itself be plus or minus depending on the direction), and consequently the first intermediate frequency IF1 obtained after filtering to remove the other components by the LC circuit LC2, will contain the frequency 10 megacycles plus E1 plus the Doppler frequency FD. The heterodyning frequency on line 14 is also designated FOT−FOH1 to identify it as the difference between the frequencies of oscillator OT and OH1.

The balanced mixer R provides an output on line 15 comprising principally the upper and lower side bands 4910 MC+2ET−E1+FD and 10 MC+E1+FD respectively as indicated by the values 2455

$$MC+ET+FD\pm(2445\ MC+ET-E1)$$

shown on line 15, and the lower side band 10 MC+E1+FD selected by LC2 becomes the first intermediate frequency IF1 on line 16 as the output of the first heterodyning stage.

The error frequency ET of the oscillator OT is cancelled in obtaining the difference frequency between the received frequency containing the ET error and the heterodyning frequency containing the ET error so that the only error remaining at this stage is the error E1 of the heterodyne oscillator OH1 of this stage.

In the next lower stage the mixture of frequencies of the oscillators OH1 and OH2 in N2 will provide the new side band frequencies 10 MC+E1±(0.465 MC+E2) for this stage on line 19 and if the lower side band frequency (FOH1−FOH2) is selected for example by LC3 this will comprise the frequency 9.535 megacycles plus E1 minus E2 on line 20, and when this heterodyning frequency is applied to the first intermediate frequency IF1 on the receiver side in N3, the new intermediate frequency IF2 comprising the difference between these frequencies includes only the error E2 of the heterodyning oscillator OH2 of this stage since the E1 error in the preceding intermediate frequency IF1 and in the heterodyning frequency FOH1−FOH2 becomes cancelled in taking this difference frequency.

In the following stage below, the frequency 465 KC+E2 of oscillator OH2 and the frequency of 20 KC+E3 of oscillator OH3 are mixed in N4 to provide the upper and lower side bands 485 KC+E2+E3 and 445 KC+E2−E3 as designated on line 24 as 465 KC+E2±(20 KC+E3). The lower side band selected by LC5 appears on line 25 as 445 KC+E2−E3 which is designated (FOH2−FOH3) as the difference between the frequencies of oscillators OH2 and OH3. The mixture of this heterodyne frequency 445 KC+E2−E3 with the preceding intermediate frequency 465 KC+E2+FD in the mixer N5 provides the upper and lower side band output frequencies of $$465\ KC+E2+FD\pm(445\ KC+E2-E3)$$

on line 27. The lower side band 20 KC+E3+FD is selected by the LC circuit LC6 as the third intermediate frequency IF3 on line 28 and represents the output of the third heterodyning stage.

In the last heterodyning stage below, the frequencies 1 KC+E4 and 20 KC+E3 of oscillators OH4 and OH3 are mixed in N6 to provide the upper and lower side band frequencies 21 KC+E3+E4 and 19 KC+E3−E4 as designated by 20 KC+E3±(1 KC+E4) on line 31. The lower side band 19 KC+E3−E4 is selected by the LC circuit LC7 on line 32 and identified as the difference frequency FOH3−FOH4 serving as the heterodyning frequency for this stage. This heterodyning frequency 19 KC+E3−E4 is mixed with the third intermediate frequency 20 KC+E3+FD from line 28 above in mixer N7 providing the sum and difference frequency output 20 KC+E3+FD±(19 KC+E3−E4) on line 33. The difference frequency is selected by the tuned amplifier circuit LC8 to provide on line 34 the output frequency 1000 cycles+E4+FD which is designated IF4 as the fourth or final intermediate frequency which serves as a scale of frequency representing speed directionally above and below zero speed at 1000 cycles as previously described.

Thus it will be noted that as the heterodyne action is traced through successively lower stages in the above example in Fig. 2 the frequency error remaining from the oscillators of the transmitter and several heterodyning stages will be only the frequency error of the final heterodyning oscillator, of which the frequency is of the order of the Doppler frequency and thus the error will be negligible in relation to the Doppler frequency.

In the example just described with reference to Fig. 2 it was assumed that the lower side band was selected in each stage for the heterodyning frequency. If however the higher side band were selected from the mixture of the heterodyne oscillator frequencies, such higher side band frequency for heterodyning against the preceding frequencies on the receiver side would have the sign of the frequency error of the oscillator of that stage direct instead of reversed as described above, and therefore in heterodyning to obtain the next intermediate frequency by difference the error of the preceding oscillator would be cancelled with the error of the oscillator of that stage alone remaining as before. For example if the higher side band as the sum of the frequencies OT and OH1 is selected by LC1 on line 14 then this higher side band 2465 MC+ET+E1 will be mixed with received frequency 2455 MC+ET+FD and in taking the difference frequency at the output of LC2 from this mixture this difference frequency will be 10 MC+E1−FD. At the next stage if the higher side band from the mixture of the frequency 10 MC+E1 and 465 KC+E2 is selected this higher side band 10.465 MC+E1+E2 will be higher than the first intermediate frequency 10 MC+E1−FD obtained from the higher side band selection just described for the preceding stage and in taking the difference frequency from a mixture of these frequencies the error E1 will be cancelled and the error +E2 will remain in the second intermediate frequency output 465 KC+E2+FD. Thus the intermediate frequency obtained from the difference of the higher side band heterodyning frequency and the preceding intermediate frequency will again cancel the error of the preceding oscillator and leave only the error of the oscillator of that particular stage.

Thus whether the higher or lower side band is selected from the mixture of the frequencies of the oscillator for a particular stage and the oscillator of the preceding stage, the intermediate frequency obtained from the difference of the heterodyning frequency and the preceding intermediate frequency or signal frequency will cancel out the error of the oscillator of the preceding stage and leave only the error of the oscillator of that particular stage, this process being carried down to the final stage where the only oscillator error remaining is that of the oscillator for that final stage.

It will be noted in the above description with relation to Fig. 2 tracing the several heterodyning steps with the frequency errors and numerical values that where the lower side band is selected from the mixture of oscillator frequencies to obtain a resultant heterodyning frequency and the difference between this heterodyning frequency and the intermediate frequency or signal frequency from the preceding stage is obtained the Doppler frequency FD will retain its sign unchanged corresponding with the original directional value of the speed, but if the higher side band is selected from the mixture of the oscillator frequencies for the resultant heterodyning frequency then the resulting difference or intermediate frequency for the particular stage will have the sign of the Doppler frequency FD reversed, and therefore if two heterodyne stages employ the higher side band for the heterodyning frequency the Doppler frequency will be reversed twice to restore it to its original sign.

Thus if the higher side band selection is employed for an even number of stages the final stage output will correspond with the sign of the original Doppler as received so that it can be read directly on the frequency meter or the like. However it will also be appreciated that if an odd number of high side band heterodyning stages is employed so that at the final stage the sign of the Doppler frequency is reversed as compared with the original received Doppler frequency, then the scale of the meter may be calibrated in reverse to show the approach speed for the average frequency minus the Doppler and to show departure speed for the average frequency plus the Doppler to obtain a correct directional speed reading.

In the above descriptions of the invention as illustrated in Figs. 1 and 2 for example four heterodyning stages are employed but it will be appreciated that more or less heterodyning stages may be employed as desired or needed to obtain an output frequency comparable to the Doppler effect. It will be appreciated that the number of stages employed will be dependent in part upon the original transmitter frequency level employed and the Doppler frequency and thus in turn on the speed level to be measured. Thus for considerably higher speeds it might be satisfactory to employ only two or three stages instead of four in order to obtain a final frequency comparable to the higher Doppler frequency that would be present for such higher speed. It will also be appreciated that the selectivity of the mixer and filter circuits as well as the other tuned coupling and amplifier circuits will be a factor in determining the number of stages and that as more highly selective circuits become available the number of stages may be reduced for any given speed level to be measured.

In this connection it will be appreciated that the successively lower heterodyning frequencies in the successive stages must be sufficiently separated from the preceding stage frequency to obtain clean separation of the desired side band frequency from the carrier or fundamental frequencies in each stage as well as from the other side band frequency.

Referring now to Fig. 3 an alternate form of a directional speed measuring apparatus according to the invention is illustrated in which a discriminator circuit is employed to convert the output speed indicating frequency to a speed indicating voltage to be applied to a voltmeter or the like, which may be then calibrated to indicate the speed directionally above and below zero speed for example. In the apparatus of Fig. 3 the output frequency on line 34 comparable to the Doppler frequency and as shifted by the Doppler frequency is applied to the input of the limiter L1 to eliminate amplitude variations, and the output of the limiter is applied via line 35 to a filter circuit LC9 to eliminate the high frequency components and provide a wave shaping effect to restore a sine wave output on line 36 of a frequency corresponding to the frequency on line 34. This output on line 36 is applied to the input of the discriminator D1 which converts the speed indicating frequency to a D. C. voltage proportional to such speed indicating frequency and of polarity corresponding to the direction of such speed. This D. C. voltage therefore provides a voltage-speed scale which may be read directly by the voltmeter VM to indicate the speed directionally above or below zero respectively for example.

The apparatus in Fig. 3 down to line 34 is similar to that of Fig. 1 but in condensed form, the multi-stage heterodyne circuit being represented by the large block 38 in the block diagram, with the oscillator, mixers, filter and amplifier circuits of a representative heterodyne stage illustrated within the block 38.

The discriminator D1 is preferably of the familiar type with a sloping frequency response characteristic on either side of a mid-frequency, providing a D. C. voltage output proportional to the frequency of the constant amplitude of the input signal on line 36, with zero output for the average frequency value of the final intermediate frequency on line 34 and with a plus voltage for one speed direction and a minus voltage for the opposite speed direction, and also providing zero voltage output in absence of signal.

The circuit of Fig. 3 has an advantage in the case of absence or loss of signal for example since in such case the meter in the Fig. 3 circuit will return to mid-position indicating zero speed whereas the meter in the Fig. 1 circuit may return to maximum negative speed position. It will be appreciated that this depends to some extent on the type of meter employed for FM in Fig. 1. A vibrating reed type frequency meter would give no indication in absence of incoming signal at the receiving antenna RA.

Fig. 4 shows apparatus employing the multi-stage heterodyne circuit 38 to operate a relay for detection or control purposes in response to the Doppler effect in a radio reflection system, the relay RR in the block 40 operating in response to at least a desired minimum speed in a desired direction which may be approach or departure dependent on the direction of polarization of the circuit through the relay RR by the rectifier 39. This may be connected in one direction to operate relay RR only on approach or may be connected in the opposite direction to operate relay RR only on departure. The relay RR will require some minimum voltage to raise its lower armature to close its contact 41 and thus will operate at and above some minimum speed in the desired direction as determined by rectifier 39.

Fig. 4 illustrates the transmitting and receiving antennas TA and RA, the transmitting oscillator OT and the multi-stage heterodyne circuit 38 as in Fig. 3, but shows the limiter and filter and discriminator combination of Fig. 3 in condensed form in the single block 45. The D. C. voltage output of the discriminator on line 37 is applied through the rectifier 39 to the coil of the relay RR so that the relay will operate only in response to approach speed or only in response to departure speed as desired. The minimum speed response of the relay may be determined as desired by any well-known method or means, by adjusting the position of the armature in relation to the coil or core of the relay or adjusting the weight of the armature by employing an armature return spring of greater or less tension or by employing more or less resistance in circuit with the coil of the relay, for example.

Several alternate forms of apparatus employing the features of the invention have been illustrated and described and several examples have been given of numerical values and selection of frequencies and the like in an illustrative rather than a limiting sense.

It will be appreciated that a number of tuned circuits might be employed at line 34 if desired to separate frequencies at different values or bands along the frequency speed scale and thus obtain separate speed measuring or detecting output circuits for different speed ranges or for separate approach and departure. Thus low pass and high pass filters might be employed to obtain departure and approach indicating signals respectively.

It will also be appreciated that direct heterodyning crystal controlled oscillators might be employed for the third and fourth stages replacing oscillator OH3 and OH4 and eliminating mixers N4, N6 and filters LC5, LC7 or for the fourth stage alone if desired and if closely controlled frequency oscillators are employed. In the case of third and fourth intermediate frequencies of 20 kc. and 1000 cycles, oscillators of 445 kc. and 19 kc. would be heterodyned against IF2 in mixer N5 and IF3 in mixer N7 respectively, these 445 kc. and 19 kc. oscillators replacing oscillators OH3 and OH4, and mixers N4 and N6 and filters LC5 and LC7 for example. With this modification the final intermediate frequency IF4 would contain the frequency error E2 of oscillator OH2 and the frequency errors of the new 445 kc. and 19 kc. oscillators, which would be negligible as compared to the Doppler frequency.

A number of modifications of parts or arrangements of the apparatus have been described. It will be appreciated by those skilled in the art that other changes may be made in parts or arrangement of the apparatus without departing from the spirit of the invention.

I claim:

1. A system for determining directionally the relative speed between a radio transmitting-receiving station and a reflecting object including in combination an ultra-high frequency oscillator having a substantially constant frequency output, means for transmitting the output of said oscillator toward the reflecting object in a concentrated beam, means for receiving such output substantially only as modified by the Doppler effect to shift its frequency as reflected from said object, a succession of heterodyning oscillators of successively lower frequency, means for mixing the output of the first such heterodyne oscillator with the output of the original U. H. F. oscillator to provide an output including the difference between the frequencies of such mixture, a tuned coupling circuit for passing only such differential frequency from such output, means for mixing the received frequency carrying the Doppler effect with the differential frequency passed by said tuned circuit to provide a first intermediate frequency output carrying the Doppler effect, a tuned intermediate frequency amplifier for such first intermediate frequency to provide only such first intermediate frequency as an output, a second lower frequency heterodyne oscillator of said series of oscillators, means for mixing the output of said second heterodyne oscillator with the output of the first heterodyne oscillator to provide an output containing the differential between the mixed frequencies of the first and second heterodyne oscillators as a component, a tuned coupling circuit for selecting and passing from such output only such differential frequency from the last named mixer, a mixer for combining the output of said first intermediate frequency amplifier and the output of said last named tuned coupling circuit to provide an output containing the difference between such mixture of frequencies as a second intermediate frequency component carrying the Doppler effect, a second tuned intermediate frequency amplifier for passing only such second intermediate frequency component as an output, further heterodyne frequency mixer means and tuned coupling circuit means and intermediate frequency mixer means and intermediate frequency amplifier means corresponding to those aforesaid but for lower heterodyning and resulting intermediate frequencies for deriving from said second intermediate frequency component a lower intermediate frequency carrying the Doppler effect as a substantial part of such last named lower intermediate frequency, and a frequency meter connected to the output of the last intermediate frequency amplifier, the frequency of the last of the succession of heterodyne oscillators being comparable to the Doppler frequency shift over the speed range to be measured and the frequency meter being calibrated to indicate zero speed for the frequency of such last heterodyne oscillator and to indicate approach speed above that frequency and departure speed below that frequency.

2. A system for determining directionally the relative speed between a radio transmitting-receiving station and a reflecting object including in combination an ultra-high frequency radio oscillator having a substantially constant frequency output, means for transmitting the output of said oscillator toward the reflecting object in a concentrated beam and means for receiving such output substantially only as modified by the Doppler effect to shift its frequency as reflected from said object, a succession of heterodyne oscillators of successively lower frequency, means for mixing the output of the first such heterodyne oscillator with the output of the original oscillator to provide an output including the difference between the frequencies of such mixture, a tuned filter circuit for passing only such differential frequency from such output, means for mixing the received frequency carrying the Doppler effect with the differential frequency passed by said tuned filter circuit to provide a first intermediate frequency output, a tuned intermediate frequency coupling circuit for such first intermediate frequency to provide only such first intermediate frequency as an output, a second lower frequency heterodyne oscillator of said series of oscillators, means for mixing the output of said second heterodyne oscillator with the output of the first heterodyne oscillator to provide an output mixture of frequencies containing the differential between such mixed frequencies as a component, a tuned filter circuit for selecting and passing from such output only such differential frequency from the last named mixer, a mixer for combining the output of said first intermediate frequency coupling circuit and the output of said last named tuned filter circuit to provide an output containing the difference between such mixture of frequencies as a second intermediate frequency component, a tuned intermediate frequency amplifier for passing only such second intermediate frequency component as an output, further heterodyne frequency mixer means and tuned filter circuit means and intermediate frequency mixer means and intermediate frequency amplifier means corresponding to those aforesaid but for lower heterodyne and resulting intermediate frequency comparable to the Doppler frequency shift over the speed range to be measured, a limiter connected to the output of the last intermediate frequency amplifier, a filter connected to the output of said limiter, a discriminator connected to the output of said filter to convert the intermediate frequency component containing the Doppler effect to a D. C. voltage proportional to such Doppler modified intermediate frequency, and a meter connected to the output of said discriminator and calibrated to read the voltage of such output in terms of speed, said meter being calibrated to read zero speed at an intermediate position at a voltage corresponding to the last heterodyne frequency and to read approach and departure speeds respectively for voltages on one and the other sides respectively of said intermediate position.

3. A system for determining directionally the relative speed between a radio transmitting-receiving station and a reflecting object including in combination an ultra-high frequency oscillator having a substantially constant frequency output, means for transmitting the output of said oscillator toward the reflecting object in a highly concentrated beam and means for receiving such output substantially only as modified by the Doppler effect to shift its frequency as reflected from said object, a succession of heterodyne oscillators of successively lower frequency, means for mixing the output of the first such heterodyne oscillator with the output of the original oscillator to provide an output including the difference between such mixed frequencies, a tuned filter circuit for passing only such differential frequency from such output, means for mixing the received frequency carrying the Doppler effect with the differential frequency passed by said tuned filter circuit to provide a first intermediate frequency output, a tuned intermediate frequency coupling circuit for such first intermediate frequency to provide only such first intermediate frequency as an output, a second lower frequency heterodyne oscillator of said series of oscillators, means for mixing the output of said second heterodyne oscillator with the output of the first heterodyne oscillator to provide an output mixture of frequencies containing a differential between such mixed frequencies as a component, a tuned filter circuit for selecting and passing from such output only such differential frequency from the last named mixer, a mixer for combining the output of said first intermediate frequency coupling circuit and the output of said last named tuned filter circuit to provide an output containing the difference between such mixture of frequencies as a second intermediate frequency component, a tuned intermediate frequency amplifier for passing only such second intermediate frequency component as an output, further heterodyne frequency mixer means and tuned filter circuit means and intermediate frequency mixer means and intermediate frequency amplifier means corresponding to those aforesaid but for lower heterodyne and resulting intermediate frequencies, a limiter connected to the output of the last intermediate frequency amplifier, a filter for such last intermediate frequency connected to the output of said limiter, a discriminator connected to the output of said filter for converting said last intermediate frequency including the Doppler frequency component to a D. C. voltage proportional to such Doppler frequency and of polarity corresponding to the alegbraic sign of such Doppler frequency with respect to the transmitted frequency, and a polarized relay circuit connected to the output of said discriminator for operating its relay in response only to an intermediate frequency as modified by Doppler frequency shift for approach as against departure.

4. A system for determining directionally the relative speed between a reflecting surface and a transmitting-receiving station including a substantially constant ultra high frequency radio oscillator for providing the frequency for transmission towards such reflecting surface, means for so transmitting such frequency, means for receiving only the frequency reflected from such surface as modified by the Doppler frequency shift caused by relative motion between the said surface and said transmitter-receiver station, means providing a succession of heterodyning stages of successively lower frequency for heterodyning the frequency received from such reflecting surface as modified by the Doppler frequency shift, each such stage including a heterodyne oscillator, a mixer for mixing the output of such heterodyne oscillator with the output of the oscillator of the preceding stage originating with the transmitting oscillator at the first stage, a tuned filter circuit to select from the output of said mixer one of the side band frequencies as its output, a mixer for mixing said side band frequency output with a frequency containing the Doppler component from the preceding stage originating with the received frequency to provide an intermediate frequency as an output, and a tuned intermediate frequency coupling circuit for the output of such last mixture of frequencies to provide an intermediate frequency output containing the Doppler shift component and of lower frequency than the preceding stage, the frequency of the heterodyne oscillator of the last stage being comparable to the Doppler shift frequency for the range of speed measured to provide an output frequency from the last intermediate frequency coupling circuit in which the Doppler frequency shift is added to and subtracted from a frequency value corresponding to the frequency of said last heterodyne oscillator in accordance with its direction to provide an output readable as zero speed at such frequency of such last heterodyne oscillator and as approach and departure speed respectively as determined by the addition and subtraction of the Doppler shift frequency for approach and departure.

5. A system as in claim 4 and including means for converting the last intermediate frequency into a direct current voltage proportional to such frequency as modified by the Doppler frequency shift in accordance with approach and departure respectively, and output means responsive only to an output voltage corresponding to appreciable approach speed.

6. A system as in claim 4 and including means for converting the last intermediate frequency into a direct current voltage proportional to such frequency as modified by the Doppler frequency shift in accordance with approach and departure respectively, and output means responsive only to an output voltage corresponding to an appreciable departure speed.

7. A system as in claim 4 in which the transmitting oscillator provides a micro-wave frequency and the first stage mixer is a balanced micro-wave mixer deriving only the upper and lower side bands of the mixture of the transmitting oscillator frequency and the first heterodyne oscillator frequency, and in which the first tuned filter circuit is a micro-wave filter tuned to the lower side band, and in which the first intermediate frequency coupling circuit is tuned to the lower side band of the mixture of the received frequency including the Doppler component and the lower side band output of the micro-wave filter and to maintain the algebraic sign of the Doppler frequency shift component unchanged throughout.

8. A system as in claim 4 in which the lower side band of each mixture of heterodyne oscillator frequencies on the transmitter side and of each mixture with the intermediate frequency on the receiver side is selected to provide an automatic cancellation of frequency errors in the successive heterodyne stages for the preceding oscillators and to maintain the algebraic sign of the Doppler shift component unchanged throughout.

9. A system for sensing the direction and value of the Doppler effect as a measure of speed of relative motion as distinguished between approach and departure between a radio transmitting-receiving station and a reflecting surface at very low speeds comparable to the vertical speed component of aircraft immediately before contact with a landing surface for example, means for transmitting constant high frequency radio waves from such station toward such surface, means receiving the part of such waves reflected from such surface as modified by the Doppler effect by such relative motion, means for isolating said receiving means from any direct transmission of such constant high frequency radio waves without reflection, means for providing a plurality of heterodyning stages of successively lower frequencies for heterodyning the frequency received from such reflecting surface, each such stage including a heterodyne oscillator having a frequency comparable to a desired intermediate frequency, means for mixing the output of such heterodyne oscillator with the output of the oscillator of the preceding stage starting with the transmitting oscillator means at the first stage, means for selecting one side band frequency only from the output of said mixer, means for mixing such side band frequency with a frequency containing the Doppler component from the preceding stage starting with the received frequency at the first stage to provide such intermediate frequency as an output, said multiple stage heterodyning means including oscillator means at its last stage having a frequency comparable to but somewhat larger than the magnitude of the maximum Doppler shift frequency expected for the maximum speed of such relative motion to provide at the final intermediate frequency an output frequency having an mid-frequency value equal to the last oscillator frequency corresponding to zero speed and having frequency values above and below this mid-frequency value as shifted by the Doppler effect to indicate the value and direction of the speed as a Doppler sense output over a continuous scale of frequency values from maximum approach speed through zero to maximum departure speed.

10. A system for directionally measuring the low substantially vertical speed component between aircraft and a landing and take-off surface characteristic of landing and take-off operations, including a substantially constant frequency microwave oscillator providing a transmitter frequency on such aircraft, highly directive radiator means on said aircraft for transmitting such transmitter frequency from said aircraft substantially vertically toward said landing surface in a relative narrow beam, highly directive receiving antenna means on said aircraft and relatively closely spaced from said radiator means so as to minimize the angle between the paths of travel of microwaves from said radiator means to said landing surface and microwaves reflected therefrom to said receiving antenna means on said aircraft to cooperate with the highly directive radiator and receiving antenna characteristics to reduce any direct transmission of said transmitter frequency from said radiator means to said receiving antenna means to a negligible intensity in comparison with the intensity of waves reflected from said landing surface to said receiving antenna means and carrying a Doppler frequency shift component characteristic both directionally and quantitively of the vertical component of the speed of the aircraft and with respect to said landing surface, a multistage heterodyne oscillator and mixer and frequency selective filtering system having an initial stage for mixing the received frequency carrying such Doppler frequency shift component as reflected from such surface with one side band only of a mixture of the transmitter frequency and an initial intermediate frequency heterodyne oscillator frequency to derive an intermediate frequency carrying the Doppler component and having a succeeding stage for mixing said intermediate frequency with a corresponding single side band only of a mixture of said initial stage heterodyne oscillator frequency and a lower intermediate heterodyne oscillator frequency to derive a second intermediate frequency carrying said Doppler component and eliminating any substantially constant error from the transmitted frequency and having a final stage for mixing the reduced intermediate frequency signal carrying such Doppler component with a frequency of average value comparable to the maximum frequency value of the Doppler frequency shift component to provide a continuous output frequency scale from a minimum frequency corresponding to a maximum Doppler departure frequency and maximum departure speed through such average frequency corresponding to zero Doppler frequency and zero speed up to a maximum frequency corresponding to a maximum Doppler approach frequency and maximum approach speed, and frequency meter means for indicating said output frequency and having a scale calibrated in speed between maximum departure speed through zero speed to maximum approach speed.

11. A system for directionally measuring the speed of a vehicle traveling along a roadway relative to a transmitting-receiving station at relatively low distance range and speed range characteristic of vehicle traffic on streets and highways, including in combination means for generating substantially constant frequency microwaves, means for radiating such waves from said transmitting-receiving station in a concentrated beam along said roadway toward said vehicle, means for receiving such waves substantially only as reflected from said vehicle as modified in frequency by the Doppler effect in accordance with the speed of approach and departure of said vehicle respectively, a multistage heterodyne circuit including a succession of heterodyne oscillators of successively lower frequencies beginning with a frequency comparable to the transmitted frequency and ending with a frequency comparable to the Doppler frequency for heterodyning the frequency received from such vehicle by said receiving means through successively lower stages of intermediate frequency, each such stage including a heterodyne oscillator, means for mixing the output of such heterodyne oscillator with the output of the oscillator of the preceding stage originating with the transmitting oscillator at the first stage and selecting a single side band frequency from such output mixture, means for mixing said selected side band frequency output with a frequency containing the Doppler component from the preceding stage originating with the received frequency to provide an intermediate frequency as an output containing such Doppler component and in which the heterodyne frequency of the last stage is slightly greater than the maximum Doppler shift frequency for the maximum range of speed to be measured to provide a final output frequency in which the Doppler frequency shift is added to and subtracted from said last heterodyne frequency in accordance with its direction to provide an output readable as zero speed at such last heterodyne frequency and as approach and departure speed respectively as determined by the addition and subtraction of the Doppler shift frequency for approach and departure, and a frequency meter connected to the said last frequency output of the last of such stages and having a scale calibrated between a maximum departure speed through zero speed to maximum approach speed.

References Cited in the file of this patent

UNITED STATES PATENTS

| Number | Name | Date |
| --- | --- | --- |
| 2,047,312 | Demarest | July 14, 1936 |
| 2,134,716 | Gunn | Nov. 1, 1938 |
| 2,232,390 | Katzin | Feb. 18, 1941 |
| 2,406,316 | Blumlein et al. | Aug. 27, 1946 |
| 2,416,791 | Beverage | Mar. 4, 1947 |
| 2,455,639 | Anderson | Dec. 7, 1948 |
| 2,468,751 | Hansen et al. | May 3, 1949 |
| 2,491,542 | Woodyard et al. | Dec. 20, 1949 |
| 2,518,864 | Carlson | Aug. 15, 1950 |
| 2,558,758 | Jaynes | July 3, 1951 |